(12) United States Patent
Ryan et al.

(10) Patent No.: US 6,467,563 B1
(45) Date of Patent: Oct. 22, 2002

(54) WINDSHIELD FRAME AIR BAG FOR PEDESTRIAN PROTECTION

(75) Inventors: Shawn Gregory Ryan, Dayton, OH (US); Srinivasan V. Raman, Rochester Hills; Jeffrey Allen Welch, Washington, both of MI (US); Ruprecht Sinnhuber, Gifhorn; Conrad Oehlerking, Meine, both of (DE); Chantal S. Parenteau, Troy, MI (US)

(73) Assignees: Delphi Technologies, Inc., Troy, MI (US); Volkswagen AG (DE)

( * ) Notice: Subject to any disclaimer, the term of this patent is extended or adjusted under 35 U.S.C. 154(b) by 42 days.

(21) Appl. No.: 09/596,927

(22) Filed: Jun. 19, 2000

(51) Int. Cl.[7] .................. B60K 28/10; B60R 21/06; B60R 21/16
(52) U.S. Cl. .............. 180/274; 280/749; 280/743.1
(58) Field of Search ................... 180/271, 274; 280/748, 749, 751, 743.1; 296/95.1

(56) References Cited

U.S. PATENT DOCUMENTS

| | | | | |
|---|---|---|---|---|
| 2,854,281 A | * | 9/1958 | Cassin | 280/749 |
| 3,037,809 A | * | 6/1962 | Praha | 280/749 |
| 3,650,542 A | * | 3/1972 | Shimano et al. | 280/749 |
| 4,171,140 A | * | 10/1979 | Toshihisa | 280/749 |
| 5,090,729 A | * | 2/1992 | Watanabe | 280/743 |
| 5,232,244 A | * | 8/1993 | Itoh | 280/749 |
| 5,439,247 A | * | 8/1995 | Kolb | 280/730.2 |
| 5,653,464 A | * | 8/1997 | Breed et al. | 280/743.1 |
| 5,931,498 A | * | 8/1999 | Keshavaraj | 280/743.1 |
| 6,019,390 A | * | 2/2000 | Keshavaraj | 280/743.1 |
| 6,182,782 B1 | * | 2/2001 | Matsuura et al. | 180/274 |

FOREIGN PATENT DOCUMENTS

| | | | | |
|---|---|---|---|---|
| DE | 2711338 A1 | * | 9/1978 | B60R/21/14 |
| DE | 19745873 | | 4/1999 | |
| DE | 19745873 A1 | * | 4/1999 | B60R/21/34 |
| JP | 07108903 | | 4/1995 | |
| JP | 07156749 | | 6/1995 | |
| JP | 10315908 | | 12/1998 | |

* cited by examiner

Primary Examiner—Brian L. Johnson
Assistant Examiner—Joselynn Y. Sliteris
(74) Attorney, Agent, or Firm—Kathryn A. Marra

(57) ABSTRACT

An air bag assembly including an inflator for discharging inflation gas and a gas receiving expansible air bag cushion of winged geometry disposed in fluid communication with the inflator such that upon release of inflation gas from the inflator the air bag cushion is deployed substantially over the windshield of an automobile as well as the pillars adjacent the windshield. View ports are present within the interior of the air bag cushion so as to maintain a degree of visibility for the vehicle operator after deployment has taken place. Mesh netting or a like material which does not unduly restrict visibility may extend across the internally formed view ports.

17 Claims, 7 Drawing Sheets

US 6,467,563 B1

WINDSHIELD FRAME AIR BAG FOR PEDESTRIAN PROTECTION

TECHNICAL FIELD

This invention relates to an air bag assembly for use in a vehicle, and more particularly to an air bag assembly including an inflatable air bag cushion deployable at the exterior of the vehicle windshield in covering relation to the windshield and surrounding frame.

BACKGROUND OF THE INVENTION

It is well known in the prior art to provide an air bag assembly including an inflatable air bag for protecting passengers seated within the interior of a vehicle. Such inflatable air bags may be deployable from a number of different locations at the interior of the vehicle including the steering column, the dash panel, the side doors, and the interior roof line. Such inflatable air bags may have a number of different configurations and inflation characteristics depending upon the location of deployment and desired function. By way of example, air bag cushions which are deployable from the steering column and dash panel are typically rapidly inflated and thereafter decompressed as the occupant to be protected comes into contact with the air bag cushion. Alternatively, it is known to utilize air bags of generally curtain-like configuration deployable from the interior roof line which may remain inflated for an extended period of time so as to provide a cushioning restraint during an extended roll-over event lasting for several seconds.

Air bag assemblies as are known in the prior art typically include a gas generating inflator which is stored in fluid communication with the inflatable air bag cushion. Upon sensing certain predetermined vehicle conditions, such as a certain amount of vehicle deceleration, a sensor sends a signal to the inflator thereby triggering the discharge of inflation gas into the air bag cushion. As the inflation gas enters the air bag cushion, the air bag cushion is forced into a deployed position for protection of the occupants within the interior of the vehicle.

While the deployment of air bag cushions within the interior of the vehicle may provide benefit to the occupants of the vehicle, such systems provide no benefit to persons on the exterior of the vehicle. By way of example, in the event of a collision between a standard automobile and a motorcycle or pedestrian, it is known that interaction may take place between the exterior surfaces of the automobile and such pedestrian or motorcycle operator which interactions are not subject to cushioning by the air bag cushions deployed at the interior of the vehicle.

SUMMARY OF THE INVENTION

The present invention offers advantages and alternatives over the prior art by providing an air bag assembly which is deployable substantially over the windshield of an automobile including the frame surrounding the windshield so as to provide a cushion for persons outside the vehicle who may come into contact with such vehicle portions during a collision event.

Advantageously, the present invention provides the feature of a substantially complete wrap-around configuration to cover the frame surrounding the windshield.

Advantageously, the present invention provides the further feature of integral viewing ports within the cushion structure thereby permitting the operator of the automobile to maintain visibility with the exterior environment subsequent to the deployment of the air bag cushion over the windshield.

These advantages and features are accomplished in a potentially preferred form of the invention by providing an air bag assembly for use in a vehicle outside of the passenger compartment. The air bag assembly includes an inflator for discharging inflation gas and a gas receiving expansible air bag cushion disposed in fluid communication with the inflator such that upon release of inflation gas from the inflator, the air bag cushion is deployed substantially over the windshield of the automobile as well as the frame surrounding the windshield. View ports are formed within the interior of the air bag cushion so as to maintain a degree of visibility for the vehicle operator after deployment has taken place. Mesh netting or a like material which does not unduly restrict visibility may extend across the internally formed view ports to promote dimensional stability of the deployed air bag cushion. The air bag cushion may be of a substantially tapered thickness from its base to its upper boundary surface thereby further promoting the proper orientation of the air bag cushion in covering relation to the windshield and surrounding frame. The materials forming the air bag cushion are preferably of an extremely low gas permeability and preferably comprise a textile material including a permeability blocking coating of suitable character. Thus, this invention provides a system for cushioning the impact of a person external to the occupant compartment of an automotive vehicle which advantageously substantially covers the windshield and surrounding frame of the automotive vehicle. In addition, the air bag cushion permits the operator of the vehicle to see through the cushion upon deployment thereby permitting the operator to engage in continued operation of the vehicle in an appropriate manner.

BRIEF DESCRIPTION OF THE DRAWINGS

The present invention is described below by way of example only, with reference to the accompanying drawings in which.

While the invention has been illustrated and generally described above and will hereinafter be described in connection with certain potentially preferred embodiments, it is to be understood that in no event is the invention to be limited to such illustrated and described embodiments. On the contrary, it is intended that the present invention shall extend to all embodiments including alternatives and modifications as may embrace the principles of this invention within the true spirit and scope thereof.

DESCRIPTION OF THE PREFERRED EMBODIMENT

Figure 1:
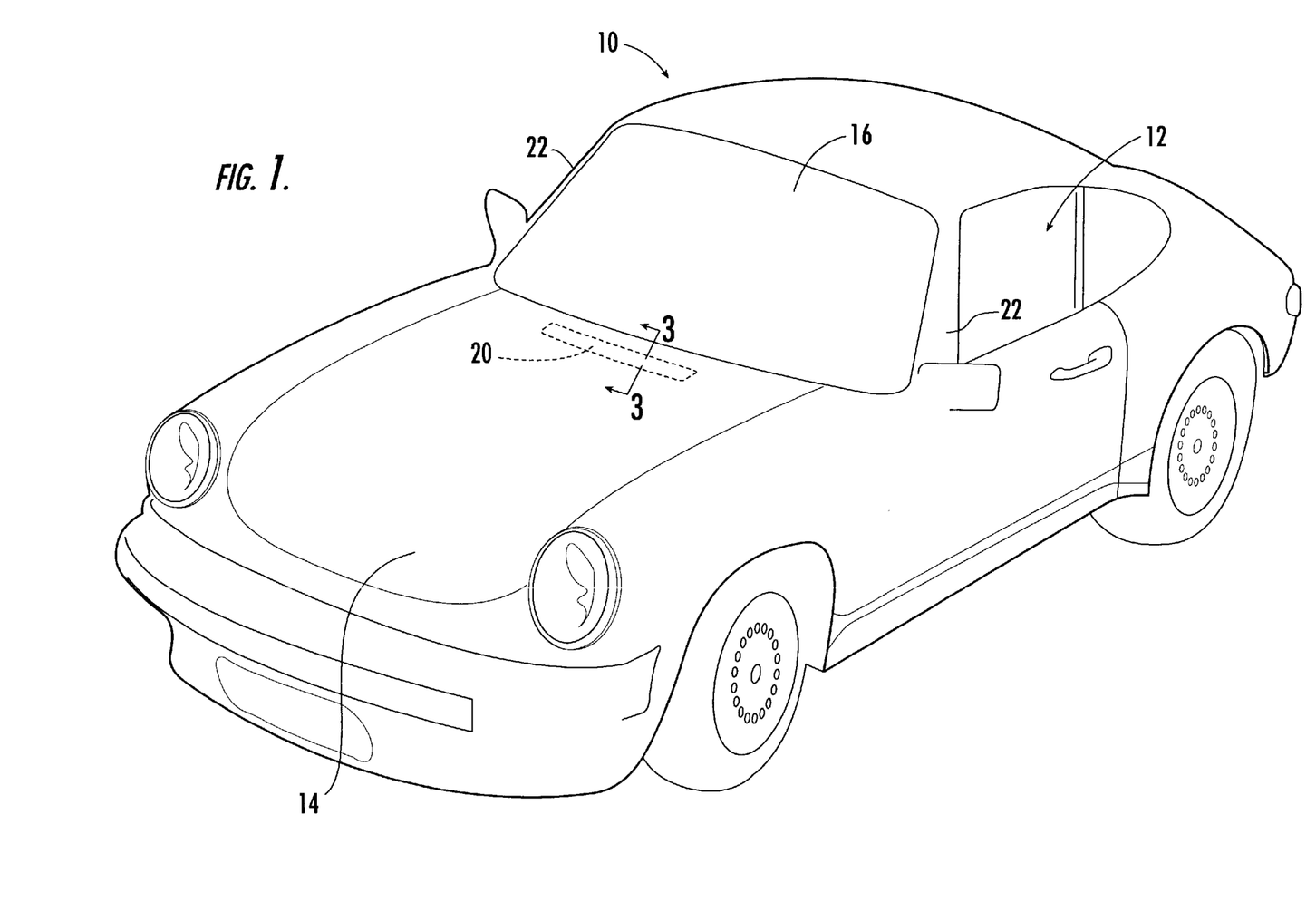
FIG. 1 is a perspective view of an automotive vehicle as may incorporate the air bag assembly according to the present invention.

Referring now to the drawings wherein to the extent possible like reference numerals are used to designate like components throughout the various views, in FIG. 1 there is illustrated a vehicle 10 including a passenger compartment 12 for housing one or more vehicle occupants (not shown). The vehicle 10 further includes an outwardly projecting hood portion 14 which extends forward from a position generally adjacent a windshield 16. Disposed below the hood portion 14 in the region adjacent to the windshield 16 is an air bag module 20 as will be discussed further hereinafter.

As will be understood, the windshield 16 is preferably formed of substantially clear glass or other suitable material and extends in a broad expanse in front of the passenger compartment 12 so as to afford the operator of the vehicle and other occupants a view of the region in front of the vehicle 10. In order to secure the windshield 16 in place, it is mounted within a frame including side pillars 22 which are commonly referred to in the art as the "A" pillars of the vehicle which provide substantial structural support to the windshield 16 as well as to the passenger compartment 12. The side pillars 22 are generally formed of metal and are substantially rigid in character. As will be appreciated, in the event that a person external to the vehicle 10 comes into contact with such side pillars 22 during a collision event, the side pillars will tend to resist energy absorptive deformation due to their substantially rigid stable character. Thus, while the windshield 16 will tend to absorb energy through flexure or breakage during an impact event, thereby providing a degree of cushioning to a person who may impact the windshield, such cushioning is generally unavailable in the event that impact occurs in relation to a side pillar 22.

Figure 2:
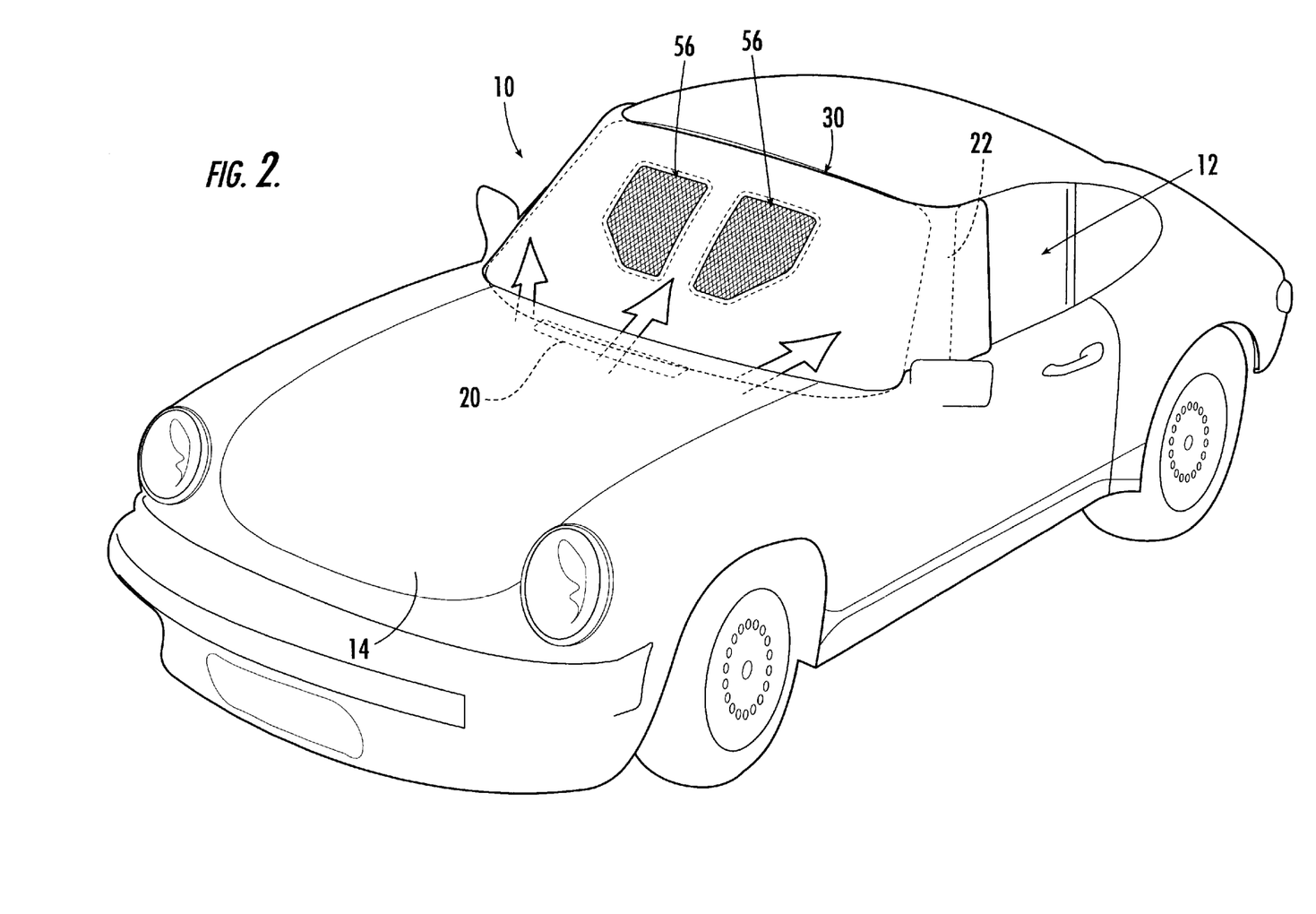
FIG. 2 is a view similar to FIG. 1 wherein the air bag assembly according to the present invention is in a deployed state.
Figure 3A:
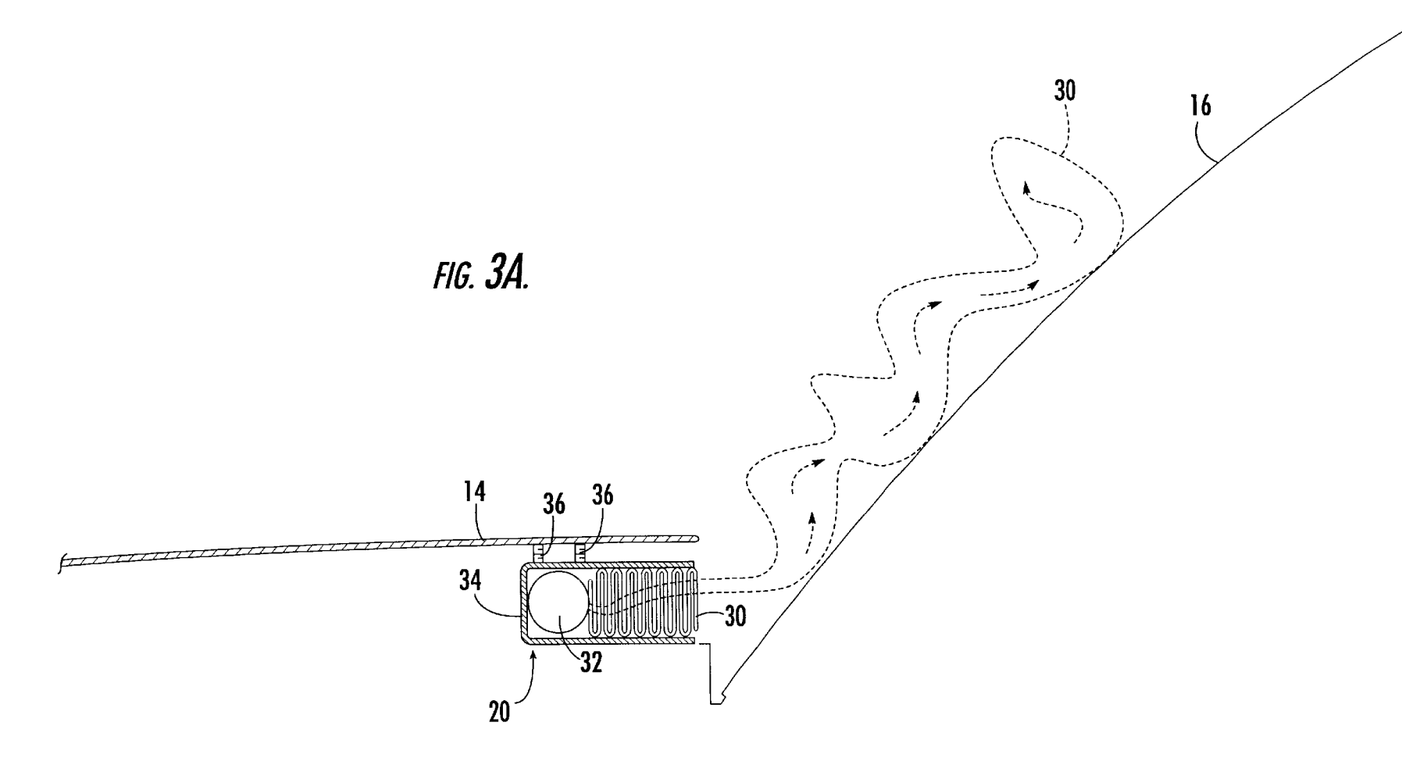
FIGS. 3A and 3B are cut away side views of the air bag assembly according to the present invention taken generally along line 3—3 in FIG. 1 illustrating potentially preferred orientations for attachment.
Figure 3B:
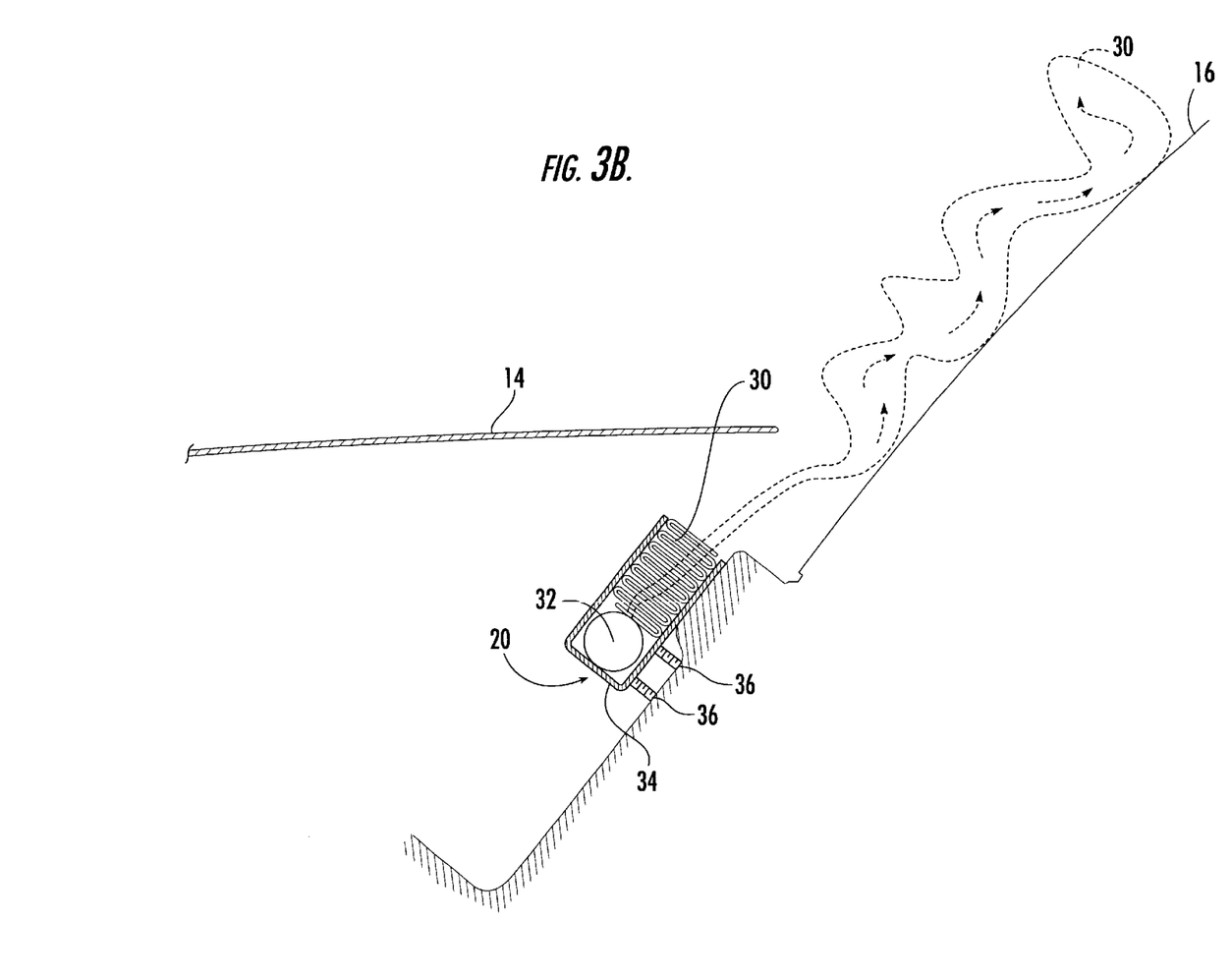

Referring now to FIGS. 2, 3A–B, 4 and 5A–D the present invention provides an inflatable air bag cushion 30 deployable in substantially covering relation to the windshield 16 and side pillars 22. As shown, the air bag cushion 30 is preferably deployable outwardly from the air bag module 20 from a position adjacent the lower edge of the windshield 16. As best illustrated in FIGS. 3A and 3B, it is contemplated that the air bag module 20 will preferably include a generally cylindrical gas generating inflator 32 which is inserted through one end wall of a generally trough shaped housing 34 of metal or plastic in a manner as will be well known to those of skill in the art. The air bag cushion 30 is preferably stored in folded relation over the gas generating inflator 32 in fluid communication therewith such that upon expulsion of gas by the inflator 32, the air bag cushion 30 receives such gas and is deployed outwardly in the manner as illustrated in broken lines in FIGS. 3A and 3B. It is contemplated that the path of travel of the air bag cushion 30 upwardly across the windshield 16 may be directed by guidewires carried within a track extending along the edge of the side pillars 22. While direct fluid communication between the air bag cushion 30 and the inflator 32 may be preferred, it is likewise contemplated that the inflating gas may be transferred from the inflator 32 to the air bag cushion 30 by means of appropriate tubing or other suitable transfer devices.

It is contemplated that the air bag module 20 may be stored at a number of different locations although attachment to the hood 14 in the region adjacent to the windshield 16 as illustrated in 3A or attachment directly below the windshield 16 as illustrated in FIG. 3B may be preferred. Such attachment may be effected by any appropriate fixture including, by way of example only, one or more bolts or snap-fit elements 36 which extend between the housing 34 and the desired point of attachment. It is believed that the deployment of the air bag cushion 30 from regions underlying the hood 14 may provide the added benefit of causing forced outward articulation of the hood 14 during exit of the air bag cushion 30. It is contemplated that such outward articulation may give rise to regions of raised profile across the hood 14 which can absorb energy by collapsing back into place upon impact by an external mass thereby providing a cushioning function during such an impact event.

The utilization of a passenger side air bag inflator 32 for inflation of the air bag cushion 30 is believed to be potentially beneficial in view of the relatively large volume of the air bag cushion 30 which may be in the range of about 60 liters or greater and will preferably be in the range of about 90 liters to about 140 liters. However, it is also contemplated that a multiplicity of gas generating inflators which expel smaller quantities of gas may be utilized if desired.

Figure 4:
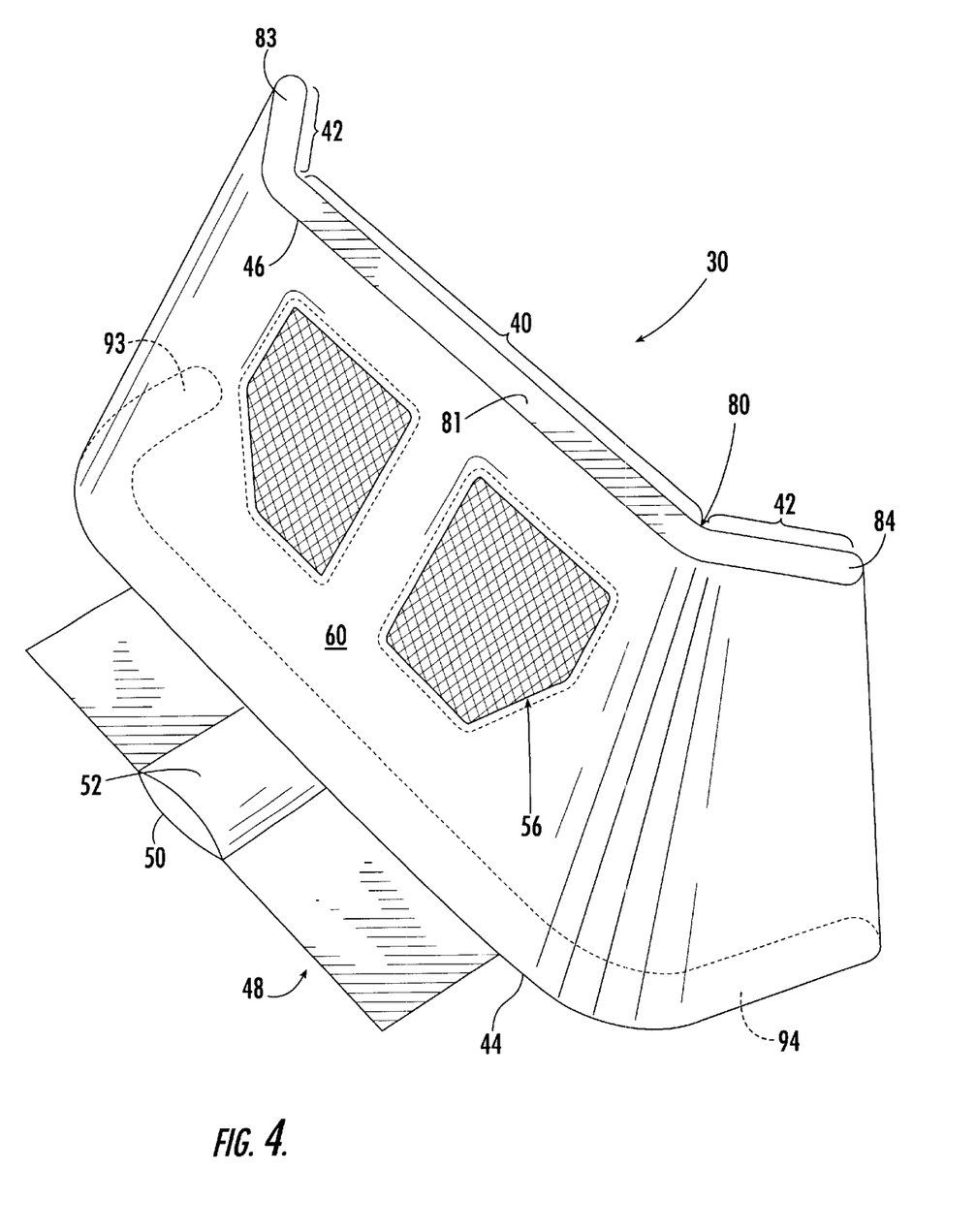
FIG. 4 illustrates a fully assembled air bag cushion for use in the air bag assembly according to the present invention.

Referring now to FIG. 4, the air bag cushion 30 according to the present invention is preferably of a generally 3-dimensional expanded profile such that upon expansion, it assumes a substantially molded configuration over the windshield 16 and side pillars 22. This potentially preferred configuration may be achieved by seaming together a relatively small number of material panels as illustrated in FIGS. 5A–5D. As illustrated, the air bag cushion 30 preferably includes a generally centrally located windshield cover section 40 and inwardly curving wing segments 42 extending in angled relation away from the windshield cover section 40. As shown, the air bag cushion 30 preferably includes a base segment 44 which extends adjacent the lower edge of the windshield 16 and an upper boundary surface 46 which extends over the upper edge of the windshield 16. As illustrated, it is contemplated that the thickness of the air bag cushion 30 will be greater at the base segment 44 than at the upper boundary surface 46. It is believed that such reduction in thickness may facilitate the ability of the air bag cushion 30 to expand over the windshield 16. As shown, the air bag cushion 30 also preferably includes an apron 48 of material extending away from the base segment 44 thereby establishing a transition between the air bag module 20 and the location of deployment of the air bag cushion 30. As illustrated, a mouth opening 50 may be formed within the apron segment 48 to convey inflation gas from the gas generating inflator 32 into the expansible body of the air bag cushion 30.

According to the illustrated and potentially preferred embodiment, the air bag cushion 30 also includes one or more view ports 56 disposed across the interior in overlying relation to the windshield 16. As best illustrated in FIG. 2, such view ports 56 permit the operator of the vehicle 10 to maintain visibility with the exterior environment even after deployment of the air bag cushion 30 takes place. It is contemplated that such maintenance of visibility may permit the operator to continue to maneuver the vehicle in an appropriate manner.

According to a potentially preferred practice for forming the air bag cushion 30 of the present invention, a plurality of panels of appropriate material may be joined together by appropriate seaming operations. In particular, it is contemplated that the air bag cushion 30 including windshield cover section 40 and wing segments 42 may be formed from a relatively small number of discrete panels of material which are joined together in a complementary relationship. According to one potentially preferred construction practice, the air bag cushion 30 may be formed from a front panel 60 of one piece construction which forms the forward facing impact surface of the air bag cushion and a rear panel 70 of one piece construction which forms the surface of the air bag cushion adjacent to the windshield 16 during deployment. According to a potentially preferred arrangement, an upper edge panel section 80 forming the upper boundary surface 46 may extend between the upper edges of the front panel 60 and the rear panel 70. A lower edge panel section 90 forming the base segment 44 may likewise extend between the front panel 60 and rear panel 70 at the lower edges thereof. While the utilization of single piece panels may be potentially preferred, it is likewise contemplated that panels formed from a plurality of individual pieces may also be utilized.

Figure 5A:
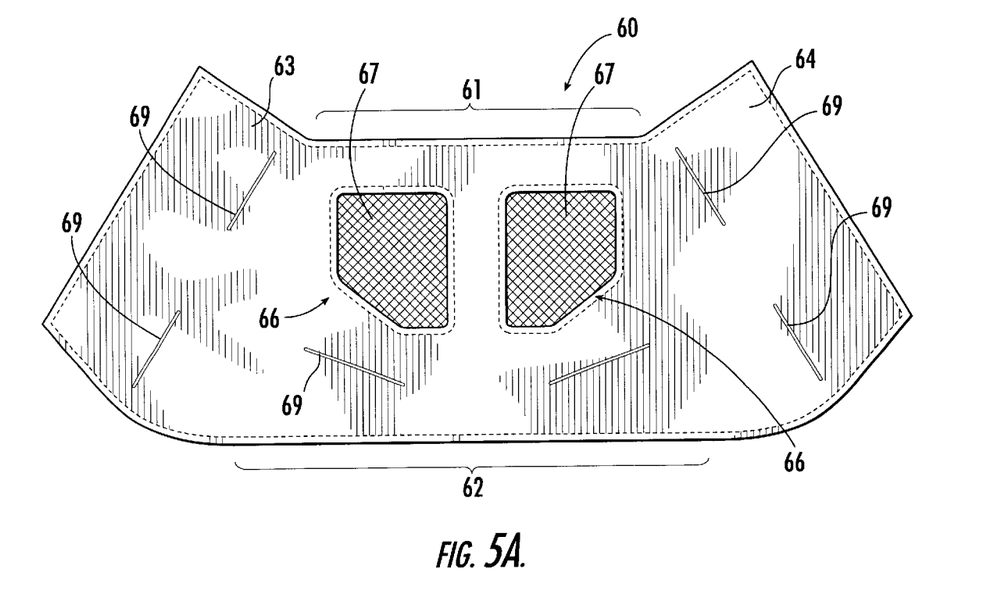
FIGS. 5A–5D illustrate the component parts of the air bag cushion as illustrated in FIG. 4.

As illustrated in FIG. 5A, the front panel 60 preferably includes a substantially straight upper boundary edge 61 and a substantially straight lower boundary edge 62. On either side of the upper boundary edge 61 and the lower boundary edge 62, lateral wing segments 63, 64 extend slightly upwardly in an angled relationship. Disposed at the interior of the front panel 60 are one or more openings 66 within the panel material corresponding to the view ports 56 in the completed air bag cushion 30. The openings 66 may be spanned by a layer of open weave mesh 67 or other suitable material of substantial see-through character.

Figure 5B:
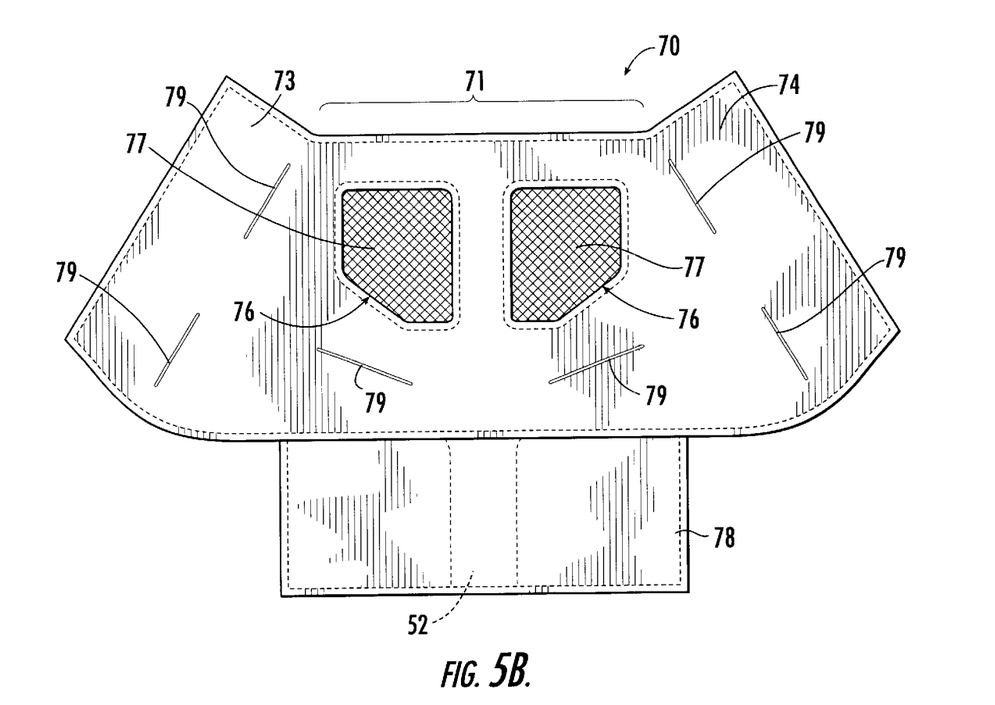

As shown in FIG. 5B, the rear panel 70 is preferably of a substantially complimentary geometry to that of the front panel 60. In particular, the rear panel 70 preferably includes an upper boundary edge 71 and upwardly angled lateral wing segments 73, 74. The rear panel 70 also preferably includes one or more openings 76 of complimentary geometry to the opening 66 in the front panel 60. An open weave mesh 77 or other suitable see-through material may extend across the opening 76. As illustrated, the rear panel 70 also preferably includes a distending tail portion 78 which may be used in formation of the apron segment 48 and mouth opening 50 as shown in FIG. 4.

Figure 5C:
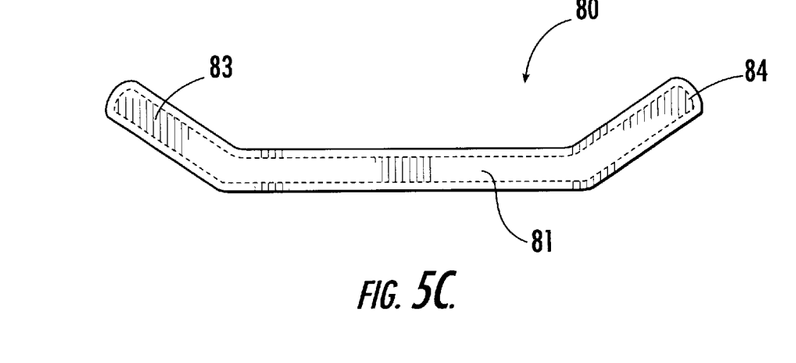

The front panel 60 and the rear panel 70 are preferably seamed directly to one another along their lateral side edges as well as in the region surrounding the complementary openings 66, 76. According to the potentially preferred practice, an upper edge panel section 80 as illustrated in 5C extends in joining relation between the front panel 60 and the rear panel 70 at the upper edges thereof. Thus, as shown the upper edge panel section 80 preferably includes a substantially straight profile center section 81 which may be joined along its edges to the upper boundary edges 61, 71 of the front panel 60 and rear panel 70 respectively. In addition, the upper edge panel section 80 preferably includes wing segments 83, 84 extending in angled relation away from the center section 81 for connection along the upper edges of the lateral wing segments 63, 64 of the front panel 60 and the upper edges of the lateral wing segments 73, 74 of the rear panel 70.

Figure 5D:
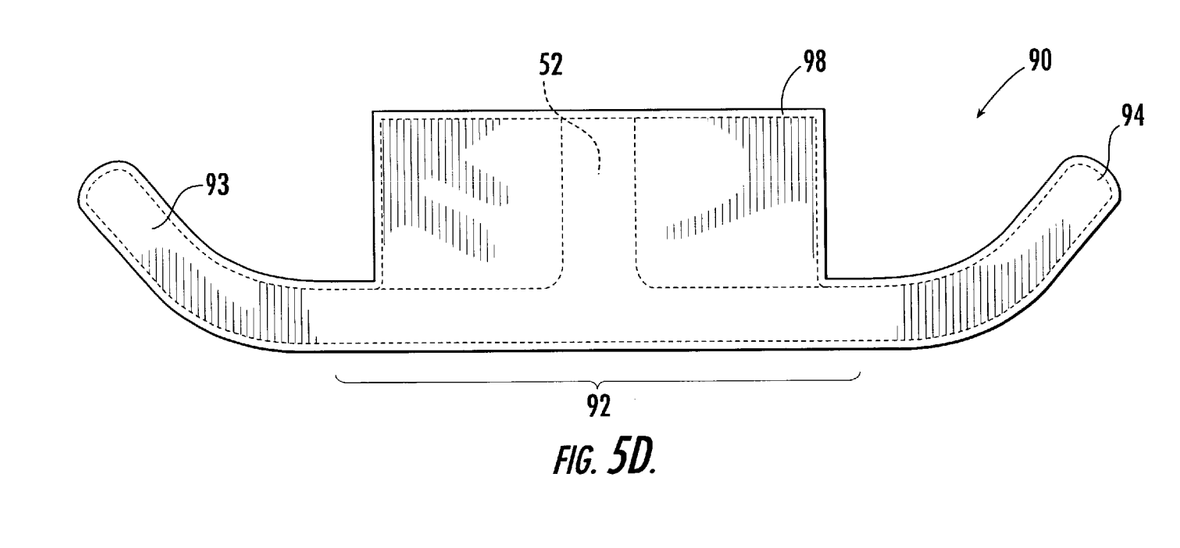

The front panel 60 and the rear panel 70 are further preferably joined at the bottom by use of the lower edge panel 90 as illustrated in FIG. 5D. The lower edge panel 90 preferably includes a substantially straight edge segment 92 which may be joined to the lower boundary edge 62 of the front panel 60. The lower edge panel 90 also preferably includes angled wing segments 93, 94 which may be joined to the corresponding lower boundary edges of the lateral wing segments 63, 64 and 73, 74 of the front panel 60 and rear panel 70 respectively. According to the illustrated and potentially preferred embodiment, the lower edge panel 90 preferably includes a flap portion 98 which may be joined about its edges to the distending tail portion 78 of the rear panel 70 so as to form the apron segment 48 of the air bag cushion 30 as shown in FIG. 4. As illustrated, the seaming relation between the flap portion 98 and the distending tail portion 78 is such that a channel 52 is established terminating at the mouth opening 50 such that inflation gas may be communicated into the air bag cushion 30.

Each of the panels 60, 70, 80, 90 forming the air bag cushion 30 is preferably formed from a substantially flat piece of material such as woven fabric or the like. Woven fabrics of nylon or polyester may be particularly preferred. If desired, such material may include a gas permeability blocking coating of a suitable composition. By way of example only, it is contemplated that such coatings may include compositions of silicone, urethanes, acrylics, polyamide dispersions or mixtures thereof.

While the geometry of the panels will permit the achievement of the generally desired configuration, it is contemplated that the achievement of the desired configuration as described above may be furthered enhanced by the inclusion of tethering elements which extend across the interior of the air bag cushion 30 between the front panel 60 and the rear panel 70. Thus, it is contemplated that the front panel 60 may include a number of tethered connection points 69 at defined locations across the interior surface thereof and that the rear panel 70 will likewise include a series of complimentary connecting points 79 which extend at defined locations across the interior surface thereof. It is contemplated that the tethering elements may be in the form of straps or may be in form of direct connections between the front panel 60 and rear panel 70 thereby giving rise to a generally quilted like inflation profile.

It is contemplated that the panels 60, 70, 80, 90 may be joined together by any suitable method yielding a substantially stable connection suitable for maintenance of inflation gas within the cushion 30. By way of example only, and not limitation, such methods may include industrial sewing, RF welding, ultrasonic welding, adhesive bonding, or combinations thereof.

It is contemplated that the size of the panel sections will be such that upon deployment, the windshield cover section 40 will extend substantially over the entire expanse between the bottom and the top of the windshield 16. Moreover, it is contemplated that the wing segments 42 will extend in a substantially wrap-around relationship so as to substantially cover the side pillars 22 extending on either side of the windshield 16. Furthermore, it is contemplated that both the placement and nature of the view ports 56 will be of such a nature that the operator of the vehicle will be able to maintain a degree of visibility upon deployment of the air bag cushion 30 so as to have the ability to continue maneuver the vehicle as may be desired.

It is to be understood that while the present invention has been illustrated and described in relation to certain potentially preferred embodiments, constructions, and procedures, that such embodiments, constructions and procedures are illustrative only and that the present invention is in no event to be limited thereto. Rather, it is contemplated that modifications and variations embodying the principles of the present invention will no doubt occur to those of skill in the art. It is therefore contemplated and intended that the present invention shall extend to all such modifications and variations as may incorporate the broad aspects of the present invention within the full spirit and scope of the appended claims and all equivalents thereto.

What is claimed is:

1. An air bag assembly for cushioning a windshield of an automotive vehicle and structural pillars disposed along lateral sides of the windshield, the air bag assembly comprising: an inflator for discharging inflation gas; an airbag cushion in fluid communication with the inflator for receiving inflation gas therein to inflate the air bag cushion, wherein the air bag cushion includes a windshield covering portion for deployment in overlying relation to the exterior of the windshield and laterally extending wing segments extending in angled relation to the windshield covering portion such that upon deployment of the air bag cushion the laterally extending wing segments extend substantially over the structural pillars disposed along the lateral sides of the windshield and, wherein the air bag cushion includes one or more view ports disposed across the windshield covering portion.

2. The invention according to claim 1, wherein a substantially see-through material extends across said one or more view ports.

3. The invention according to claim 2, wherein the substantially see-through material comprises a mesh netting.

4. The invention according to claim 1, wherein the air bag cushion is of a substantially three dimensional configuration including a front face, a rear face, a base portion and an upper boundary surface, and wherein the air bag cushion comprises a first panel of material forming the front face of the air bag cushion, a second panel of material forming the rear face of the air bag cushion, a third panel of material extending between the first and second panels of material thereby forming the base portion of the air bag cushion and a fourth panel of material extending between the first and second panels of material thereby forming the upper boundary surface of the air bag cushion.

5. The invention according to claim 4, wherein the first panel of material comprises a textile fabric.

6. The invention according to claim 4, wherein the second panel of material comprises a textile fabric.

7. The invention according to claim 4, wherein each of said first through fourth panels of material comprises a textile fabric.

8. The invention according to claim 1, further including an apron portion extending away from the air bag cushion and adapted for disposition between the windshield air bag cushion and a location below a hood portion of the vehicle.

9. The invention according to claim 8, wherein the apron portion includes a gas channel disposed therethrough and adapted to transmit inflation gas to the air bag cushion.

10. The invention according to claim 9, wherein the apron portion includes non-inflating segments outboard of the gas channel.

11. An air bag assembly for cushioning a windshield of an automotive vehicle and structural pillars disposed along lateral sides of the windshield, the air bag assembly comprising: an inflator for discharging inflation gas; an airbag cushion of substantially enclosed seamed construction in fluid communication with the inflator for receipt of inflation gas therein to inflate the air bag cushion, wherein the air bag cushion includes a windshield covering portion for deployment in overlying relation to the exterior of the windshield and laterally extending wing segments extending in angled relation to the windshield covering portion such that upon deployment of the air bag cushion the laterally extending wing segments extend substantially over the structural pillars disposed along the lateral sides of the windshield, the windshield covering portion including one or more view ports disposed therethrough and, wherein the air bag cushion includes a base portion of a first depth and an upper boundary surface of a second depth and wherein the depth of the base portion is greater than the depth of the upper boundary surface such that the air bag cushion is of a substantially tapered configuration.

12. The invention according to claim 11, wherein the air bag cushion comprises a first panel of material forming a front of the air bag cushion, a second panel of material forming a rear of the air bag cushion, a third panel of material extending between the first and second panels of material thereby forming the base portion of the air bag cushion and a fourth panel of material extending between the first and second panels of material thereby forming the upper boundary surface of the air bag cushion.

13. The invention according to claim 12, wherein the first panel of material comprises a textile fabric.

14. The invention according to claim 12, wherein the second panel of material comprises a textile fabric.

15. The invention according to claim 12, wherein each of said first through fourth panels of material comprises a textile fabric.

16. An air bag assembly for cushioning a windshield of an automotive vehicle and structural pillars disposed along lateral sides of the windshield against impact by a pedestrian, the air bag assembly comprising: an inflator for discharging inflation gas; an airbag cushion in fluid communication with the inflator and having a windshield covering portion for deployment in overlying relation to the exterior of the windshield upon introduction of the inflation gas; and an apron portion extending away from the inflator so as to be located between the inflator and the air bag cushion and adapted for disposition at location below a hood portion of the vehicle.

17. The invention according to claim 16, wherein the apron portion includes a gas channel disposed therethrough and adapted to transmit inflation gas into the air bag cushion.

* * * * *